United States Patent
Cote et al.

Patent Number: 5,961,670
Date of Patent: Oct. 5, 1999

[54] SULFUR DYES

[75] Inventors: Philip N. Cote, Kennesaw, Ga.; Xiangfu Lan, Charlotte, N.C.; Alex I. Shakhnovich, Schenectady, N.Y.; Manuel Jose Domingo, Barcelona, Spain

[73] Assignee: Clariant Finance (BVI) Limited, United Kingdom

[21] Appl. No.: 08/741,484

[22] Filed: Oct. 30, 1996

Related U.S. Application Data

[63] Continuation-in-part of application No. 08/598,759, Feb. 8, 1996, abandoned, which is a continuation-in-part of application No. 08/434,422, May 3, 1995, abandoned.

[30] Foreign Application Priority Data

Apr. 26, 1996 [TR] Turkey .................................. 96/00348
Apr. 29, 1996 [EP] European Pat. Off. ............. 96810271

[51] Int. Cl.$^6$ ................. D06P 1/30; D06P 1/651
[52] U.S. Cl. .................. 8/652; 8/585; 8/604; 8/607; 8/608; 564/63; 568/425; 568/494
[58] Field of Search ................. 8/652, 585, 586, 8/604, 607, 608; 552/293, 296; 564/63; 568/425, 494

[56] References Cited

U.S. PATENT DOCUMENTS

| | | |
|---|---|---|
| Re. 11,659 | 4/1898 | Vidal . |
| 2,472,052 | 5/1949 | Conn .......................................... 8/652 |
| 4,240,791 | 12/1980 | Sato et al. .................................. 8/465 |
| 4,519,805 | 5/1985 | Koci ............................................ 8/652 |
| 4,917,706 | 4/1990 | Meszaros .................................... 8/652 |
| 4,950,306 | 8/1990 | Marte et al. ................................ 8/607 |
| 5,470,356 | 11/1995 | Meszaros .................................... 8/652 |
| 5,611,818 | 3/1997 | Domingo .................................... 8/524 |

FOREIGN PATENT DOCUMENTS

| | | |
|---|---|---|
| 052748 | 10/1981 | European Pat. Off. . |
| 2252944 | 5/1974 | Germany . |

OTHER PUBLICATIONS

Color Index, vol. 4, pp. 4484–4487 (1971).
English translation of Japanese Kokoku 48–15237, published May 12, 1973.
Encyclopedia of Chemical Technology, 3rd Edition, Kirk–Othmer, vol. 22, pp. 168–189 (1983) John Wiley & Sons, Inc.

*Primary Examiner*—Margaret Einsmann
*Attorney, Agent, or Firm*—Thomas C. Doyle

[57] ABSTRACT

New sulfur dyes comprising in their preparation at least one sulfur dye intermediate of the formula I

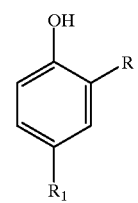

wherein R and $R_1$ are independently nitro, nitroso or amino, are produced by including in their preparation at least one modifying agent selected from the group of: A) an aldehyde; B) urea; C) a benzoquinone or naphthoquinone; and D) monoethanolamine or by treating an already prepared sulfur dye involving such an intermediate in its preparation, with at least one aldehyde, benzoquinone or naphthoquinone or with monoethanolamine.

80 Claims, No Drawings

SULFUR DYES

This application is a continuation-in-part of application Ser. No. 08/598,759 filed Feb. 8, 1996 which is a continuation-in-part of application Ser. No. 08/434,422 filed May 3, 1995 both now abandoned.

This invention relates to sulfur dyes, their manufacture and use.

Sulfur dyes represent a general class of dyes having a long history. They are generally prepared from aromatic intermediates or starting materials which are reacted with sulfur or a sulfur compound in a process generally viewed as involving both coupling and thionation. In earlier times, the dyes were made from relatively complex materials, including natural materials, whose chemical structure was often not precisely known. In more modern times, chemicals of discrete and known structures are used as starting materials. However, in either case, the structures of the resulting sulfur dyes are still seldom exactly known, and probably often involve variable and complex mixtures. As a result, sulfur dyes are generally described in the Colour Index, the authoritative work on dyes generally, by their starting materials, conditions of manufacture and a few fundamental properties such as color and solubility. Given this background, the successful improvement and modification of sulfur dyes has been typically a matter of trial and error.

The aromatic intermediates (starting materials) used in making sulfur dyes can, for purposes of this invention, be described as relatively common aromatic compounds, such as benzene, naphthalene, diphenyl, diphenylamine, azobenzene and the like which bear at least one nitro, nitroso, amino, substituted amino, or hydroxy group. The Colour Index also has classified these intermediates to include: 1)Mononuclear Benzenoid Amino and Nitro Compounds; 2) Binuclear Benzenoid Amino and Nitro Compounds; 3) Substituted Phenols; 4) Substituted Naphthalenes; 5) Polycyclic Compounds; 6) Indophenols; and 7) Acridine, Azine, Oxazone and Thiazone Compounds. One or more such intermediates, which may be from the same or different intermediate classification, may be used in making a single dye product and other chemical intermediates, not fitting the above definition, are occasionally used in combination with such intermediates.

In preparation of sulfur dyes, there may be used sulfur itself, but a sulfur compound which is a polysulfide is more typically used, e.g. sodium polysulfide. Other sulfur compounds providing a source of sulfur may also be used, such as sodium sulfide.

Sulfur dyes may be made by processes which have been divided into well-recognized categories such as sulfur bake, polysulfide bake, fluid polysulfide melt and solvent melt. In all these process categories the basic reaction of the intermediate(s) with the sulfur or sulfur compound is carried out. The fluid polysulfide melt reaction, for example, involves forming a coupling mass by initial reaction of the intermediate(s) and the sulfur of sulfur compound and heating the coupling mass under reflux or pressure in a closed vessel to effect thionation. Such process is widely used in making many sulfur dyes, including the most commonly used sulfur dye known as C.I. Sulfur Black 1 (C.I. No. 53185, the solubilized form upon reaction with sodium bisulfite being C.I. No. 53186). The processes may vary in a number of respects as is well-known including work up after formation of the crude thionation product. Hence, presscakes may be formed from the crude product after different treatments of the crude products and the presscakes handled differently depending on product forms which can include powders, pastes, grains and liquids including aqueous solutions. Sulfur dyes commonly exist in two well-known forms; one in which the dye exhibits its color (oxidized form) and one in which it is of lesser color or colorless (reduced or leuco form), the reduced form being returned to the color form by oxidation and the reduced form being produced by chemical reduction of the color form. Since the dyes can be sold and used in either form, further reaction in work up of the crude thionation product may be carried out to obtain the desired product form. Final products are more usually the reduced form.

In general, compositions used as dyes, including sulfur dye compositions, must satisfy a number of criteria and do so to varying extents, hence creating a continuing interest in new dyes, including new sulfur dyes. Among the criteria of interest are the effects of a dye upon the substrate it is used to dye. Sulfur dyes, for example, are well-known to be inclined to weaken fabrics, an effect called "tendering". While this effect varies depending upon the particular sulfur dye, it is particularly significant with a number of sulfur dyes of varying color and chemical compositions. Whether or not tendering is experienced more with dyes of darker shades or with dyes prepared from particular intermediates is unclear. However, it is caused to a high level by most black dyes, such as those prepared from 2,4-dinitrophenol and its equivalent intermediates, and is distinctly and disturbingly high in the case of the most widely used sulfur dye, i.e. C.I. Sulfur Black 1, the use of which would be greater but for its tendering effect.

An object of the invention is to provide new sulfur dye compositions. Another object is to provide sulfur dye compositions with reduced tendering effects. A further objective is to reduce the tendering effects of black sulfur dyes including particularly those of the character of C.I. Sulfur Black 1.

BRIEF DESCRIPTION OF THE INVENTION

In accordance with the present invention, new sulfur dye preparations, which may be in oxidized or reduced form, are those which comprise in their preparation at least one sulfur dye intermediate of the formula I:

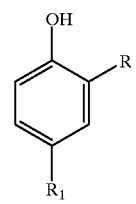

wherein R and $R_1$ are independently nitro, nitroso or amino, and which have combined therein, preferably reactively combined therein, at least one modifying agent selected from the group consisting of: A) an aldehyde; B) urea; C) a benzoquinone or naphthoquinone; D) monoethanolamine; and a reaction product of A, B, C or D.

By "reaction product of A, B, C or D" is meant, in particular, a product formed by the decomposition of A, B, C or D or by their reaction with one another under the reaction conditions.

The invention also provides processes for the preparation of the new sulfur dyes of the invention, in particular, processes which comprise subjecting a mixture of sulfur or a sulfur compound and a sulfur dye intermediate of Formula I, or a product of reacting such a mixture, to elevated temperature conditions in the presence of a modifying agent A, B, C or D. One preferred process, herein Process X, generally involves reacting a modifying agent A, B, C or D, above, or combination thereof, during the preparation of the sulfur dye by reaction of sulfur or a sulfur compound and sulfur dye intermediate such that the desired amount of modifying agent or reaction product thereof is combined, preferably reactively combined, during the process.

In another such process, herein Process Y, an already prepared sulfur dye, after completion of the thionation, is combined with, preferably reacted with, a modifying agent A, C or D, or combination thereof or reaction product thereof Preferred embodiments of the new sulfur dyes of the invention involve those substantially having the characteristics of known sulfur dyes which have a tendering effect on a substrate on which they are dyed, but which have less tendering effect than the similar dyes prepared without the modifying agent used in our invention.

The invention also provides a process for the coloring of cellulosic substrates and other substrates colorable with sulfur dyes, said process comprising coloring the substrate with a sulfur dye of the invention. Also provided are the resulting dyed substrates.

DETAILED DESCRIPTION OF INVENTION

The present invention provides new sulfur dyes prepared by reacting sulfur or a sulfur compound (providing a source of sulfur for sulfur dye preparations) and at least one sulfur dye intermediate (starting material) of the formula I:

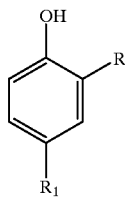

I wherein R and $R_1$ are independently nitro, nitroso or amino, said new sulfur dyes being essentially modified, preferably reactively modified, sulfur dyes by reason of including in their preparation at least one modifying agent selected from the group consisting of A) an aldehyde; B) urea; C) a benzoquinone or naphthoquinone and D) monoethanolamine.

New, modified sulfur dyes in accord with the invention may be also prepared from already prepared sulfur dyes, wherein the desired thionation in its preparation has been completed, by combining such a prepared sulfur dye with at least one aldehyde, benzoquinone, naphthoquinone or monoethanolamine modifying agent, preferably under such conditions that the modifying agent undergoes a chemical reaction, more preferably a chemical reaction with the prepared sulfur dye. Hence, an aldehyde, benzoquinone, naphthoquinone or monoethanolamine may be used to form the new sulfur dyes at any time during or after the preparation of a sulfur dye.

Thus, a modified sulfur dye according to this invention is a sulfur dye which differs from an otherwise identically producible sulfur dye essentially by virtue of a modifying agent, A, B, C or D having been used in its preparation in an amount effective to produce a dye having reduced tendering properties as compared with the otherwise identically producible sulfur dye.

When the modifying agent is urea, it will be included in the sulfur dye preparation before completion of the desired thionation reaction, preferably in good time to permit the urea to react, more preferably to be reactively combined in the sulfur dye product formed upon completion of the thionation. However, the modifying agents may generally be added for reaction in different stages or at different times consistent with the foregoing. For example, urea may be added during the sulfur dye preparation and the resulting completely thionated, urea modified sulfur dye further treated with an aldehyde, benzoquinone or naphthoquinone modifying agent. Or an aldehyde, benzoquinone or naphthoquinone may be included during the sulfur dye preparation reaction and the resulting product upon completion of the desired thionation may be then further reacted with the same or different aldehyde(s), benzoquinone(s) or naphthoquinone(s).

In general, the preferred modifying agent is a combination of one or more aldehydes and urea that is included in the sulfur dye preparation process. More preferably the combination is glyoxal and/or glyoxylic acid and urea.

The particularly preferred sulfur dye intermediate of the formula I is 2,4-dinitrophenol.

When the modifying agent comprises an aldehyde, it may be any organic compound bearing one or more aldehyde groups, and may be cyclic or acyclic, saturated or unsaturated, branched or straight chain and may be any compound which forms an aldehyde after addition to the reaction mixture. More particularly, the aldehyde may be aromatic, araliphatic or aliphatic, in the latter case cyclic or acyclic, saturated or unsaturated, branched or straight chain, or it may be a corresponding compound which forms an aldehyde after being added to the reaction mixture. Simple acyclic aldehydes conforming to the formula $H(CH_2)_x$—CHO wherein x is preferably 0 to 4 may be used and introduced in liquid or gaseous form. Formaldehyde, for example, may be introduced as a gas or in solution as formalin. Acyclic compounds bearing two aldehyde groups preferably conform to the formula $OHC$—$(CH_2)_x$—$CHO$ wherein x is preferably 0 to 4, more preferably 0, 2, 3 or 4, e.g. glyoxal and malonaldehyde. Glyoxal, the dialdehyde in which x is 0, is a most preferred aldehyde. Unsaturated acyclic dialdehydes such as glutaconaldehyde may also be used and included among the preferred aldehydes. Another group of preferred aldehydes include those conforming to the formula $OHC$—$(CH_2)_x$—$COOH$ wherein x is as above defined. Glyoxylic acid, the acid/aldehyde of such formula wherein x is 0, is also a most preferred aldehyde. Still another group of preferred aldehydes include those conforming to the formula $OHC$—$(CH_2)_x$—$CH_2OH$ wherein x is as above defined. Hydroxyacetaldehyde, the alcohol/aldehyde of this latter formula wherein x is 0, is also a preferred aldehyde, such compound being generally available in aqueous solution in equilibrium with its dimer form. A further group of preferred aldehydes includes those of the formula $OHC$—$(CH_2)_x$—$CH_2Cl$, such as the compound wherein x is 0, i.e. chloroacetaldehyde. Cyclic aldehydes may be saturated or partially or fully unsaturated and may be monocyclic or polycyclic, but are preferably monocyclic or bicyclic, more preferably monocyclic. Examples of aromatic aldehydes include benzene substituted by one or more aldehyde groups such as benzaldehyde and salicylaldehyde. Preferably, the benzene ring is disubstituted by an aldehyde group, usually —CHO, such as the compounds phthalaldehyde and p-benzenedialdehyde. The aldehyde compounds may bear other substituents in addition to the aldehyde groups. Such substituents especially include hydroxy, carboxy and halo, e.g. fluoro, chloro and bromo, and $C_{1-4}$ alkyl substituents on cyclic aldehydes. Other substituents of interest include nitro, amino, nitroso, imine, substituted amino and other nitrogen containing substituents. When an aldehyde A) is aliphatic, it preferably contains no more than two hydroxy substituents, more preferably no more than one hydroxy substituent. Most preferably, any aliphatic aldehyde A) is unsubstituted or bears one substituent selected from the above, particularly —OH, Cl, carboxy or a nitrogen-containing substituent, e.g. —CN or —CONH$_2$. Cyclic aldehydes, whether aromatic or aliphatic, may be homocyclic or heterocyclic. Cyclic aldehydes are preferably homocyclic, i.e. non-heterocyclic compounds. Also for purposes of definition herein, an aldehyde, other than formaldehyde, is a chemical compound bearing at least one —CHO group linked to the balance of the compound by a carbon-to-carbon bond.

The modifying agent may be added to the reaction mixture or reactants as such or may be formed in situ. Aldehyde molecules particularly tend to form compounds with each other or other compounds that readily liberate or regenerate the aldehyde form or do so under the process conditions used in carrying out the invention. Such compounds may be used in the invention to generate an aldehyde in situ for purposes of carrying out the invention. Hence, it is well known that aldehydes form with each other dimers, trimers and other polymeric forms, linear and cyclic, which are useful as aldehydes by being a source thereof. Paraformaldehyde, for example, is a well known polymeric form of formaldehyde that liberates formaldehyde upon heating. Aldehydes also form products with other type compounds, such as addition products, which liberate or regenerate the aldehyde under the reaction conditions employed in carrying out the invention. Well known examples of aldehyde addition products which liberate aldehydes under basic conditions are the sodium bisulfite aldehyde addition products.

When the modifying agent is or involves a quinone, it is preferably a 1,2- or 1,4-benzoquinone or 1,2- or 1,4-naphthoquinone, more preferably a 1,4-benzoquinone or 1,4-naphthoquinone, and still more preferably a 1,4-benzoquinone. Such quinone modifying agents may be substituted by one or more of a variety of substituents, in particular by one or more $C_{1-4}$alkyl (eg. methyl), $C_{1-4}$alkoxy (eg. methoxy), hydroxy and halo (fluoro, chloro or bromo) groups, or combinations thereof. The substituent(s) may be on the quinone ring or, in the case of naphthoquinone, also on the fused benzene ring portion. The preferred such quinones are either unsubstituted or substituted by halo substituents, especially chloro. Examples of such halo substituted compounds are 2,3,5,6-tetrachloro-1,4-benzoquinone and 2,3-dihalo-1,4-naphthoquinone.

The modifying agent may be employed in widely varying amounts including amounts which are in excess of those which can be reactively combined into the final product. The amount of modifying agent introduced into the reaction may be expressed as a weight percent of the total weight of the modified sulfur dye product (dry solids content). In general, at least two weight percent of modifying agent will be employed and reacted in order to effect a desired modification of the preparation. As a practical matter, the amount of modifying agent A, B or C or any combination thereof employed and consumed in the reaction product will represent from 2 to 30 percent by weight of the modified sulfur dye and the amount will preferably range from 4 to 25 percent by weight, more preferably from 6 to 20 percent by weight. The amount of modifying agent D, when used alone, will range from 2 to 35%, preferably 5 to 25%, more preferably 7 to 20%. When modifying agent D is used in combination with A, B or C or any combination thereof, the weight of the total combination is generally in the range 2 to 50%, preferably 10 to 40%, based on the dry weight of modified sulfur dye product.

The preferred modifying agents are aldehydes when used alone or in combination with another type modifying agent. In a particularly preferred embodiment, the modifying agent is a combination of an aldehyde modifying agent and urea, preferably in a mol ratio of aldehyde to urea of 5:1 to 1:5, more preferably 4:1 to 1:5, more preferably 4:1 to 1:4, and most preferably 3:1 to 1:3. One preferred combination involves: A) glyoxal, glyoxylic acid or combinations thereof; and B) urea. Another preferred combination is hydroxyacetaldehyde (or the dimer thereof) and urea. The particularly preferred combination is a dialdehyde and urea, especially glyoxal and urea.

When monoethanolamine is used in combination with modifying agent A, B or C or any combination thereof, particularly with urea and/or glyoxal, as is preferred for such combinations, the ratio of mols of monoethanolamine to total mols of other modifying agents is preferably in the range 3:1 to 1:4, more preferably 2:1 to 1:3.

The present invention is applicable to sulfur dyes prepared from one or more intermediates which are substantially all of the type of formula I and to sulfur dyes prepared from combinations of sulfur dye intermediates in which one or more are a compound of the formula I and one or more intermediates are not of the type of formula I. The intermediates of the type of formula I may constitute as little as 20 mol percent of all sulfur dye intermediates in the preparation. More suitably, intermediates of formula I constitute at least 40 weight percent, preferably at least 50 weight percent, of all sulfur dye intermediates in the preparation. The intermediates of the formula I may be combined with a host of other sulfur dye intermediates to form new, modified sulfur dyes in accord with the invention. Such other intermediates of particular interest include those aromatic compounds which have been combined with the intermediates of the formula I in forming black dyes. Representative of such other dye intermediates forming black dye with the intermediates of formula I are picric acid, picramic acid, p-aminophenol and p-(2,4-dinitroanilino)phenol. Preferably, in these combinations, the intermediate of the formula I, eg. 2,4-dinitrophenol, will be 50 to 90%, more preferably 60 to 90%, by weight of the combination and the other intermediate(s) will constitute 10 to 50%, more preferably 10–40%, by weight of the combination. Sulfur dyes prepared from one or more intermediates which are substantially only of the type of formula I are of particular interest.

Specific, representative intermediate compositions involving one or more intermediates and of particular interest for modification in accord with the invention include those set forth below by Colour Index identification and color(s) commonly obtained therefrom.

| Composition | Color(s) | C.I. Index |
| --- | --- | --- |
| C-1) a) 2,4-dinitrophenol | green to bluish black | C.I. Sulfur Black 1 |
| C-2) a) 2,4-dinitrophenol and b-1) picric acid, and/or b-2) picramic acid | bluish black | C.I. Sulphur Black 2 |

| Composition | Color(s) | C.I. Index |
| --- | --- | --- |
| C-3) a) 2,4-dinitrophenol<br>b) p-(2,4-dinitroanilino)-<br>phenol | bluish black | C.I. Sulfur Black 12 |
| C-4) a) 2,4-dinitrophenol<br>b) p-aminophenol | greenish black | C.I. Sulphur Black 10 |

The preparation of sulfur dyes is well-known and generally conducted at elevated temperatures over varying periods of time. It is well-known in the sulfur dye art that temperatures and times of reaction as well as other parameters directly influence the product to be obtained including such basic characteristics as color and shade, and even the structure of these complex dyes. It is well within the knowledge of those skilled in the art to select the conditions for particular dye objectives. In general, the preparation of sulfur dyes involves the reaction of one or more sulfur dye intermediates (as starting material) in an overall process involving a progression of intermediary products in a pathway culminating in the final desired sulfur dye. While little is known with certainty concerning the exact nature or number of intermediary products or the number of stages which may be identified in the overall process, it is recognized that the initial contact in melt or solution of the starting materials results in an exothermic reaction, called "coupling", which subsides and results in intermediary products referred to as the "coupling mass". This mass, with or without separation and/or adjustment, is then driven by external heating in a reaction referred to as "thionation" until the desired sulfur dye is formed as a crude product. The modification of sulfur dyes in accord with the invention may be effected by incorporating the modifying agents into the established procedures for preparation of sulfur dyes, including the various process types known as the sulfur bake, polysulfide bake, fluid polysulfide melt and solvent melt, and carrying out such processes essentially in the conventional ways, such as done in preparing particular products.

Hence, the new sulfur dyes of the invention may be prepared by introduction of the modifying agent into the preparation processes in a variety of ways and at different time points.

According to one type of procedure, the sulfur dyes of the invention may be prepared by introduction of the modifying agent into the reaction mixture from which the crude sulfur dye is prepared. This may be done at any time from the beginning of the process up to near the end of the reaction in the thionation stage, preferably so that time is allowed for the modifying agent to react. Hence, the modifying agent may be added to the starting materials or to any of the variety of intermediary products or reaction mixtures formed in the pathway leading to the final crude sulfur dye product. Since the overall process may be viewed as staged, the modifying agent may be introduced prior to or during any stage, preferably so that time for reaction of the desired amount of modifying agent is allowed prior to formation of the crude product upon completion of the thionation reaction. The sulfur dyes of the invention are desirably prepared with the modifying agent being added after reaction and conversion of the sulfur dye intermediate(s) has commenced, such as in the coupling reaction or to the coupling mass. Preferably, the new sulfur dyes are prepared in a fluid polysulfide melt process as is commonly used for many black dyes including C.I. Sulfur Black 1.

For example, a typical fluid polysulfide melt process involves reactions at elevated temperatures in the presence of water under alkaline conditions and typically begins by adding the sulfur dye intermediate(s) to a concentrated aqueous polysulfide solution whereby an exothermic reaction called "coupling" takes place, and upon completion of the desired coupling a coupling mass is created. This may be viewed as a first stage. The coupling mass (reaction product) is then heated in a second stage, optionally after dilution with water and transfer to another vessel, to effect the thionation reaction. In carrying out the invention in a fluid melt type process, the modifying agent may be introduced at any time prior to the coupling reaction, such as by combining with one or more of the starting materials prior to the exothermic coupling reaction, or added during the coupling reaction to form the coupling mass, or added to the coupling mass and even during the thionation. Desirably, the modifying agent is added to the coupling mass prior to or upon commencement of the thionation reaction.

In the fluid melt process the exothermic coupling reaction to form the coupling mass is generally allowed to be carried out at regulated elevated temperatures which are usually in the range of 70° C. to 200° C., more typically 90° C. to 120° C. Times may vary widely from 15 minutes to 5 hours, more usually from 20 minutes to 3 hours, depending mainly on the product sought and batch size. The reaction may be conducted at atmospheric pressure or above, and hence may be carried out under reflux conditions or under pressure in a sealed reactor. The reaction is typically initiated by controlled combining of the dye intermediate(s) with the sulfur or sulfur compound, e.g. by slow or staged addition of the intermediate(s) to the sulfur or sulfur compound.

Following the completion of the mixing of all of the sulfur compound and sulfur dye intermediate to be used in the reaction, the point in time at which the temperature of the exothermic reaction begins to recede can be viewed as approximately the beginning of the period of complete formation of the intermediary products representing the coupling mass and the point at which the reaction mixture would return to room temperature on its own can be viewed as the end of the period, such period herein being "the coupling mass period" and the reaction mixture and/or its intermediary products as they exist substantially during the coupling mass period and thereafter in the substantial absence of the heat required to drive the thionation reaction can be viewed as the coupling mass. A coupling mass can also be viewed herein as formed when treated as such by the particular process procedure or operator as indicated for example by transfer of the initial exothermic reaction mass or products to a different reaction vessel or a change in media or temperature conditions for purposes of effecting the thionation reaction or stage which leads to the crude sulfur dye product. Preferably, the modifying agent, especially one comprising a modifying agent A, B, C or combination thereof is added at or before the point in time which is eighty percent (80%) through the reaction time period between the first application of heat to drive the reaction after formation of the coupling mass and the cessation of the application of heating at the completion of thionation, ie. formation of the final crude sulfur dye product, more preferably at or before fifty percent of the time in such period has passed. Since particular sulfur dyes are usually prepared according to set procedures including thionation time to provide a number of desired properties, it is generally undesirable to extend the thionation reaction merely to reactively combine the modifying agent when the invention is used to modify an established sulfur dye, such as to modify tendering properties while substantially retaining other desired properties. Hence, the desirable point of addition of the modifying agent is to the coupling mass and particularly and conveniently to the final coupling mass on completion of the coupling reaction when transfer of the mass or other condition changes are often made to begin the thionation. It is therefore apparent that in the most preferred embodiments the period for the modifying agent to act on the reaction mass and, preferably, undergo a chemical reaction will at least substantially overlap or take place during the initial portions of the thionation reaction and, when the modifying agent is added to the final coupling, will take place beginning essentially from the start of the thionation stage and will essentially be carried out entirely during the thionation stage.

Following the formation of the coupling mass, as in the fluid melt process, the thionation reaction is conducted. The coupling mass may be diluted with water before the thionation reaction is carried out. While the modifying compound may be added during the thionation reaction, it is most preferably added to the coupling mass from the coupling reaction and just prior to the thionation reaction, or soon after the thionation reaction has commenced. Hence, the modifying compound, or the balance of the same to the desired total amount not added for or during the coupling reaction, may be added to the coupling mass or may be added to dilution water or to the water diluted coupling mass when the coupling is to be diluted with water for the thionation. However, it will be understood that many standard fluid melt processes are carried out in a single reactor essentially without interruption or change between the formation of the coupling mass and commencement of the thionation. In such cases the modifying agent is preferably simply added at about the time of formation of the coupling mass. The thionation reaction is then carried out in the conventional manner as indicated for the particular sulfur dye being sought. The conditions of thionation, particularly in terms of temperature and time, may vary widely depending upon the properties of the dye. In the fluid melt process the temperature usually ranges from about 90° C. to 300° C., more usually 95° C. to 200° C. and often 100° C. to 150° C. Times may vary from only a few hours, e.g. 3 hours, to several days, e.g. 5 days, and are usually between 5 hours and 90 hours. Time is considerably influenced by batch size as is well-known, as well as dye objectives. The thionation reaction may be also carried out under reflux or elevated pressures, but is typically carried out under elevated pressures of up to 100 psig, more usually 20 to 100 psig, e.g. 45 to 80 psig.

The temperature of the coupling mass or the thionation reaction mass when the modifying agent is added thereto is not critical and may range from 0° to 100° C. When the temperature is about 80° C. or higher, the modifying agent is preferably added gradually rather than all at once, typically over a period of 10 to 120 minutes for each component which is separately added.

Some modifying agents, such as formaldehyde and glyoxal, may be undesirably volatile under the reaction conditions under which they are to be reacted. When the more volatile agents are used, it is preferred to add them under conditions in which the volatility will be controlled. Thus, agents such as formaldehyde and glyoxal are more conveniently added when the reaction stage is to be conducted under sufficient pressure to control the volatility.

According to another procedure, the modifying agent is added to the thionation reaction mixture after completion of the thionation reaction and the resulting mixture is heated to a temperature of at least 105° C., preferably at least 120° C, more preferably 125 to 145° C. This procedure has been found to be particularly suitable when the modifying agent is monoethanolamine.

Various additives or non-aromatic reactants for particular purposes may also be present in either or both of the reaction mixtures for the coupling reaction and thionation reaction. Such materials are well-known and generally used in the particular recipe for particular dyes.

Upon completion of the thionation reaction in all processes for preparation of sulfur dyes, a crude sulfur dye product is formed in which the sulfur dye may be considered to be of undesired purity and is often in both reduced and oxidized forms. This crude product can then be treated and worked up by a variety of procedures known in the art to obtain the desired final product. These procedures often include formation of a presscake as an intermediate product form of upgraded purity from which unreacted starting materials and side products are largely or wholly removed, typically by precipitation and filtering. In the simplest procedures, the crude product is subjected to air (aeration) or oxygen treatment to oxidize the portion of the product in reduced dye form and effect precipitation of a sulfur dye product mass from which the purified presscake can be recovered, e.g. by filtration of the precipitate. In another procedure, the crude product is subjected to acid precipitation using, for example, sulfuric acid, and a purified and oxidized presscake (which may contain —SH groups) obtained from the resulting precipitate, a procedure which is preferred when the crude product has been produced by heating an already formed thionation product with monoethanolamine as described above. In still another procedure, the crude product is both desulfurized and aerated (oxidized) to obtain the presscake. Desulfrrized sulfur dyes are sulfur dyes treated post-preparation (after thionation) to modify and/or even eliminate some sulfur in the sulfur linkages which are internally present in the sulfur dye, and their preparation is well-known. See, for example, U.S. Pat. No. 5,470,356, the entire disclosure of which is incorporated herein by reference. Desulfurization is generally viewed as modifying, usually by shortening the polysulfide linkages created in the complex sulfur dye structures by the thionation reaction. A preferred process for desulfurization involves treating the dye with glucose in an alkali metal hydroxide solution, e.g. an aqueous solution of sodium hydroxide, at temperatures of from 75° C. to 105° C., preferably 85° C. to 100° C.

The presscake is generally used to produce final product forms. If the modified sulfur dye is to be sold and used in solubilized, reduced dye forms, the presscake can be subjected to any one of a variety of conventional treatments to obtain such final product forms. The presscake can also be used to produce stable aqueous suspensions, as disclosed in U.S. patent application Ser. No. 08/707,876, filed Sep. 9, 1996, the entire disclosure of which is incorporated herein by reference.

In accord with the invention, it has been found that the new sulfur dyes of the invention may also be prepared by reaction of a prepared sulfur dye, i.e. after completion of thionation resulting in the crude sulfur dye preparation, by desulfurizing the sulfur dye and treating the desulfurized dye with an aldehyde modifying agent or precursor or with a modifying agent C or D. Such treatment may be carried out at any time such as with a desulfurized crude product or desulfurized oxidized presscake, and other desulfurized forms. For example, the crude preparation may be oxidized to produce the dye substantially in oxidized form, then desulfurized and then reacted, optionally after presscake formation, with the modifying agent or the crude dye desulfurized and then reacted with the modifying agent, followed by oxidation and formation of the presscake. Or the dye may be desulfurized, oxidized and then reacted, optionally after presscake formation, with the modifying agent. Such modifying reaction may be generally carried out under varying conditions, but preferably is conducted by combining the desulfurized sulfur dye with water and the modifying compound and heating the mixture at 50° C. to 150° C., more preferably 60° C. to 120° C., most preferably 70° C. to 110° C., until the desired amount of modifying agent is reactively combined with the dye. Preferably, the pH of the reaction mixture is maintained within the range 5 to 9 during the reaction. Reaction times may vary fairly widely and usually are in the range of 1 hour to 50 hours, more usually 2 to 40 hours, with batch size again influencing the time to desired results.

The new dyes of the invention have the character of sulfur dyes and are suitable for dyeing substrates that are dyeable with conventional sulfur dyes (e.g. cellulosic substrates or even polyamidic substrates) by methods conventionally suitable for conventional unmodified sulfur dyes, i.e. employing their leuco form (which can be produced by reducing the non-reduced form of the dye in a manner analogous to conventional reducing methods for the production of leuco sulfur dyes from conventional unmodified sulfur dyes, e.g. by reaction with an alkali metal sulfide or hydrosulfide, or with a non-sulfide reducing agent, such as reducing sugar, preferably under alkaline conditions, suitably with heating e.g. to temperatures $\geq 60°$ C.), dyeing (e.g. under alkaline conditions, e.g. at pH $\geq 9$, optionally with heating) and reoxidizing (e.g. under acidic to weakly basic conditions).

References herein to the Colour Index are to the Third Edition, 1971 (Vol. 4).

The entire disclosure of application Ser. No. 08/434,422, filed May 3, 1995 is incorporated herein by reference.

The following Examples will be understood to merely illustrate the invention.

Procedure A: Tendering Test

In the following examples, the tendering effect of synthesized dyes of the invention was measured for comparison against the tendering effect of standard or similar dyes which had been prepared in essentially the same manner, except that the modifying agent was omitted. Tendering was measured and determined by the recognized standard test procedure according to AATCC Test Method 26-1994:Aging of Sulfur-Dyed Textiles:Accelerated (AATCC Technical Manual, Vol. 70, 1995), an outline of which is as follows:

A) Apparatus

Oven: Fisher Scientific Isotemp Oven Model 630 G, with dimension: 19 in (width)×17.5 in (height)×15 in (depth), capacity=2.886 cu ft. The oven is connected to a vent.

Glass tray for water: 10.125 in×6.125 in surface area=62 in$^2$ Rack: A 4-row wooden rack with 2.5 inch distance between rows. Each row has 9 wood pins to hold pieces of cloth. The rack is placed in the oven with a distance of 3 inches to the top of the oven and with rows parallel to the back of the oven. The back and the front rows have a distance of 3 inches to the oven back and front wall, respectively.

B) Materials

Cloth: The dyed cloth (cotton twill) is cut into 2 in×6 in size of pieces. From each sample dyeing of 5 inch by 1 yard, at least 16 pieces will be obtained, of which 8 will be hanged to be aged, 8 will be stored unaged.

Total weight of cloth to be aged: 25 g/cu ft×2.886=72 g
Water: 100 g/cu ft×2.886=288.6 g.

C) Procedure (a) Cut the dyed cloth into the desired size and weigh the cloth to obtain a total weight of 72 g for each oven (normally, 4 samples with 32 pieces are used, 3–6 dummy pieces need to be used to make up the weight.

(b) Mount the cloth to the rack and place into the oven (c) Weigh 288.6 g of water into the tray. The tray is placed under the hanging cloth in the center.

(d) The oven is pre-calibrated and pre-set to 135+/−2° C. After the materials and water are in place, turn the oven heat on. Record the oven temperature and the temperature on the thermocouple thermometer (Cole-Parmer Digi-Sense) which is inserted from the vent to the center of the oven and the center of the cloth.

(e) When the temperature reaches the desired temperature (it takes approximately 3 hours), continue heating for 6 hours.

(f) At the end of the 6 hours, turn the oven heat off and take the rack out. Let it condition at laboratory environment for 16 hours, or overnight, before performing the breaking strength test.

D) Procedure for Tendering Test (a) The breaking strength (BS) test is performed on a tensile tester model Testometric 220D.

(b) The breaking strength is tested on the unaged pieces of cloth and then totaled to give BS(unaged).

(c) The breaking strength is tested on the aged and conditioned pieces of cloth and then totalled to give BS(aged).

(d) Tendering is calculated as follows:

[BS(unaged)−BS(aged)]×100%=tendering (%) BS(unaged)

Except as noted in the following examples, the tendering tests in the examples were carried out as above described.

EXAMPLE 1

2,4-Dinitrochlorobenzene (100.5 g) is hydrolyzed with a mixture of 87 g of 50% sodium hydroxide and 400 g water at 100° C. for 1–1.5 hrs. The resulting 2,4-dinitrophenolate solution is slowly mixed hot over the course of 20 minutes with hot polysulfide solution, prepared in a 1000 ml. vessel equipped with Dean-Stark trap by combining of 89 g of sodium sulfhydrate solution (45%), 72 g sulfur and 57.2 g of 50% aqueous sodium hydroxide. During mixing the reaction temperature is controlled at about 90–100° C. by means of refluxing. An additional 50 g of hot water from washing the phenolate reaction vessel is then added, and the reaction mixture maintained at about 104–106° C. for an additional 30 minutes with about 200 ml. of water collected overhead. The resulting reaction mixture (coupling mass) at 90–95° C. is then brought to 700 g by the addition of water and the mixture is transferred to a one liter stainless steel autoclave equipped with a stirrer. To this mixture, after cooling to 35° C., is added 28 g of 40% glyoxal solution, the autoclave is sealed and heated for 12 hrs. at 122° C.

After cooling and opening of the autoclave the reaction mixture is transferred to a heating beaker with a stirrer and aeration tube and heated to 65° C. and at this temperature the air oxidation of the mixture is conducted during 2 hrs. Approximately at this time the spot test of the mixture on the plain filter paper shows a weakly bluish runout (oxidation complete). The pH of the mixture (approximately 8.5–9.0) is adjusted to 7.5 with 25% sulfuric acid (approximately 25 g) and the mixture is immediately filtered under vacuum. The presscake weight is 190–210 g; solids content 57–63%. After determination of the solids (20 g of presscake) the dye is solubilized by adding 74 g of the dye presscake (60% solids) to a mixture of 30 g 50% sodium hydroxide, 23.3 g of 45% sodium sulfhydrate solution and 32.9 g water at 85° C. The resulting mixture is stirred at 105° C. for 2 hrs. The total weight of the liquid dye is brought to 166.7 g by addition of water.

A dyebath is prepared by mixing 20 opg (ounces per gallon) of the above-prepared liquid dye, 6 opg glucose/caustic sulfur dye reducing agent available under the trade designation Reducer RDT, 6 opg 50% sodium hydroxide and 1 opg of phosphate ester wetting agent available under the trade designation Penetrant EH and cotton twill is dyed by the pad-steam method. The dye is oxidized by the solution, containing 7.5 g/l acetic acid, 7.5 g/l of vanadium-catalyzed sodium bromate oxidizing agent available under the registered trademark DYETONE and 1.0 g/l of a scouring agent based on a sodium salt of an acrylic acid homopolymer which is available under the registered trademark SANDOPURE RSK. The fabric is submitted to the accelerated aging test at 135° C. according to AATCC Test Method 26-1994 described above. The same fabric dyed with 20 opg of the similar C.I. Sulfur Black 1 type dye prepared without the glyoxal is submitted to the same aging as a standard. After conditioning the samples at room temperature overnight the tensile strength of the cloth is determined by the tear tester. The tendering of the fabric dyed with the modified dye of the invention has only 45–55% of the tendering caused by the similar C.I. Sulfur Black 1 dye.

EXAMPLE 2

A wet desulfurized C.I. Sulfur Black 1 presscake (100.3 g; 27.56% solids) prepared in the manner described in Step 1 of Example 14 hereinafter is stirred for 5 hrs. at 80° C. with 11.0 g of 40% glyoxal solution and 300 ml water. The dye is filtered off and solubilized by mixing with 41 g of 50% sodium hydroxide, 7 g glucose and 12 g water, giving 160 g of liquid dye which is used to dye cotton twill.

The dyebath is prepared by mixing 20 opg of the liquid dye, 12 opg Reducer RDT, 12 opg 50% sodium hydroxide and 1 opg Penetrant EH and 4 opg of lignosulfonate dispersing agent available under the registered trademark REAX-85A. The cotton twill is dyed by the pad-steam method. The dye is oxidized by the solution, containing 7.5 g/l acetic acid, 7.5 g/l DYETONE and 1.0 g/l of SANDOPURE RSK. The resulting dyed fabric is submitted to the accelerated aging test at 135° C. according to AATCC Test Method 26-1994. The same fabric dyed with 20 opg of SANDOZOL Black 4G-RDT (a black sulfur dye in prereduced liquid form similarly prepared without glyoxal or desulfurization) is subjected to the same aging as a standard. After conditioning the samples at room temperature overnight the tensile strength of the cloth is determined by the tear tester. The tendering of the fabric dyed with the glyoxal-modified dye is 45–55% of the tendering caused by the SANDOZOL Black 4G-RDT.

EXAMPLE 3

The procedure of Example 1 is repeated except that, instead of glyoxal, 11.2 g. of urea is added to the coupling mass followed by heating at 120–125° C. for 8 hours to complete the thionation reaction. The tendering of the fabric dyed with the resulting dye is 42–68% compared to about 80% tendering caused by the similar C.I. Sulfur Black 1 type dye The procedure d without the urea.

EXAMPLE 4

The procedure of Example 1 is repeated except that, instead of glyoxal alone, 32.2 g. of 40% aqueous solution of glyoxal and 11.2 g. of urea are separately added followed by heating at 120–124° C. for 8 hours to complete the thionation reaction (final pressure 60 psig). The tendering of the fabric dyed with the resulting dye is 34–64%, 22–46% and 36–42% compared to about 80%, 75–80% and 73–80% tendering, respectively, caused by the similar C.I. Sulfur Black 1 type standard dye prepared without the glyoxal and urea.

EXAMPLE 5

The procedure of Example 2 is repeated except that, instead of glyoxal, 11.9 g. of formaldehyde in the form of 37% aqueous solution of formalin is added to the wet desulfurized presscake followed by heating at 80° C. for 5 hours. The tendering of the fabrics dyed with the resulting dye is 52% and 47% compared to a tendering of 78% for the standard dye.

EXAMPLE 6

The procedure of Example 2 is repeated except that, instead of glyoxal, 12 g. of pentanedial is added to the desulfurized presscake followed by heating at 80° C. for 5 hours. The tendering of the fabric dyed with the resulting dye is 48% compared to a tendering of 74% for the standard dye.

EXAMPLE 7

The procedure of Example 2 is repeated except that, instead of glyoxal, 12 g. of p-benzenedialdehyde is added to the desulfurized presscake followed by heating at 80° C. for 5 hours. The tendering of the fabric dyed with the resulting dye is 49% compared to a tendering of 77% for the standard dye.

EXAMPLE 8

The procedure of Example 2 is repeated except that, instead of glyoxal, 2.8 g. of butyraldehyde is added to the desulfurized presscake followed by heating at 80° C. for 4 hours. The tendering of the fabric dyed with the resulting dye is 53% compared to a tendering of 77% for the standard dye.

EXAMPLE 8A

Example 8 is repeated with one-half the amount of butyraldehyde. The tendering is 57% compared to 77% for the standard.

EXAMPLE 9

The procedure of Example 2 is again repeated except that, instead of glyoxal, 2.8 g. of o-hydroxybenzaldehyde (salicylaldehyde) is added to the desulfurized presscake followed by heating at 80° C. for 4 hours. The tendering of the fabric dyed with the resulting dye is 34% compared to a tendering of 82% for the standard dye.

EXAMPLE 9A

Example 9 is repeated with one-half the amount of o-hydroxybenzaldehyde. The tendering is 43% compared to 82% for the standard.

EXAMPLE 10

The procedure of Example 2 is repeated except that, instead of glyoxal, 5.6 g. of a 50% aqueous solution of $ClCH_2CHO$ is added to the desulfurized presscake followed by heating at 80° C. for 4 hours. The tendering of the fabric dyed with the resulting dye is 47% compared to a tendering of 80% for the standard dye.

EXAMPLE 10A

Example 10 is repeated with one-half the amount of the $ClCH_2CHO$. The tendering is 54% compared to 80% for the standard.

EXAMPLE 11

The procedure of Example 2 is repeated except that, instead of glyoxal, 2.7 g. of benzoquinone is added to the wet desulfurized presscake followed by heating at 80° C. for 5 hours. The tendering of fabrics dyed with the resulting dye averages about 45% compared to an average tendering of 78% for the standard dye.

EXAMPLE 12

The procedure of Example 2 is repeated except that, instead of glyoxal, 2.7 g. of 2,3,5,6-Tetrachloro-1,4-benzoquinone is added to the wet desulfurized presscake followed by heating at 80° C for 5 hours. The tendering of fabrics dyed with the resulting dye averages about 48% compared to an average tendering of 77% for the standard dye.

EXAMPLE 13

The procedure of Example 2 is repeated except that, instead of glyoxal, 2.7 g. of 2,3-dichloro-1,4-naphthoquinone is added to the wet desulfurized presscake followed by heating at 80° C. for 5 hours. The tendering of fabrics dyed with the resulting dye averages about 42.5% compared to an average tendering of 78% for the standard dye.

EXAMPLE 14

Post Preparation Glyoxal Modification Of Desulfurized C.I. Sulfur Black 1

Step 1: Desulfurization

Seven grams of 50% sodium hydroxide were added to 500 g of crude C.I. Sulfur Black 1 (prepared by fluid aqueous polysulfide melt from 2,4-dinitrophenol) and the mixture was heated to 50° C. At this point 36 g of dextrose were added, followed by dropwise addition of 116 g of 50% NaOH during 1 hour. The reaction mixture was heated and stirred at 98° C. for one hour, cooled to 25° C. and pH was adjusted to 9.8–9.9 with 140 g of 25% sulfuric acid. The reaction mixture was aerated at 40° C., maintaining pH 9.8–9.9 by addition of 25% sulfuric acid. Aeration time was about 9 hours. The reaction mixture, which had a clear bluish runout when spot tested on plain filter paper, was filtered and the precipitate was washed with water to give 134 g of wet desulfurized presscake (dry %=29.25).

Step 2: Glyoxal Treatment of Desulfurized Presscake 100 g of wet desulfurized presscake from Step 1 (dry %=29.25) was mixed with 300 g water, stirred for 5 min. and 11 g of 40% glyoxal solution were added all at once. The mixture was heated with stirring at 80° C. during 4 hours and the treated dye was filtered off and washed with water. The weight of the dye presscake was 50 g (dry %=60). The dye was solubilized by adding 20 g of 50% sodium hydroxide solution and 16.3 g of 45% sodium hydrosulfide solution and heating for 2 hrs at 105° C. The resulting dye was used to dye cotton will at 20–24 opg to give 85–95% dyeings for comparison with cotton twill similarly dyed with Sodyesul Liquid Black 4G-CF, a C.I. Leuco Sulfur Black 1 similarly prepared without glyoxal or desulfurization. The tendering was tested according to AATCC Test Method 26-1994.

For the standard Sodyesul Liquid Black 4G-CF, the strength loss was about 75%, whereas for the glyoxal-treated product the strength loss was 40% at 85% dyeing strength. The shade of the dyeing with the modified dye was within= 0.3 unit of the standard.

EXAMPLE 15

700 g of a C.I. Sulfur Black 1 coupling mass prepared as in Example 1 were placed in a 1000 ml autoclave. Then 20.25 g of glyoxylic acid monohydrate and 11.2 g of urea were added to the coupling mass. The reaction vessel was sealed and heated 8 hrs at 122° C. The autoclave was cooled and opened and the reaction mixture was aerated at 65° C. during 2 hours. At the end of the aeration the pH was 7.64, so no pH adjustment was needed. The dye precipitate was filtered off. The amount of presscake was 272.12 g having 51.55% dry weight, or 140.3 g of the dry dye.

172.2 g of this presscake was mixed with 60 g of 50% sodium hydroxide, 46.6 g of 45% sodium hydrosulfide and 54.6 g of water and this mixture was heated at reflux with stirring for 2 hours. The dye solution weight is 333.4 g. This liquid dye at 20 opg had a dye strength which was 85.4% of the dye strength of a similarly formulated C.I. Sulfur Black 1 standard. The cotton twill cloth was dyed as in Example 1 with this dye at 25 opg (96.3% vs 20 opg) and was submitted to the tendering test. The tendering is 23% compared to 65% for the standard C.I. Sulfur Black 1 dye at 20 opg.

EXAMPLE 16

Modification of C.I. Sulfur Black 10 Type

Into a 500 ml 5-neck flask, fitted with stirrer, condenser, thermometer, and heating mantle, was added 57.2 g of 50% caustic and 89.0 g of 45% sodium sulfhydrate and this mixture was heated with stirring to 70° C. To the mixture was added 72.0 g of sulfur followed by stirring at 70–80° C. until the sulfur was in solution.

In a 1 Liter autoclave vessel equipped with stirrer and thermometer was added 361.6 g of water, 47.6 g of 50% caustic, 51.3 g of water-wet 2,4-dinitrophenol (89%) and 27.0 g of para-aminophenol (100%). The temperature rose to 32° C.

The hot polysulfide prepared above (at 70–80° C.) was added to the autoclave with stirring. There was then added 32.4 g of 40% glyoxal solution and 11.2 g of urea. The reaction mixture was allowed to heat up slowly to 120–124° C., and then held at 120–124° C. for 14 hours.

At the end of 14 hours, the autoclave was cooled to 0 psig and room temperature. The contents of autoclave were transferred to a 3 liter beaker and set up for airing. Make volume up to approximately 1500 ml with water. Heat to 65–70° C. and air at 65–70° C. for 2 hours. Then pH is adjusted from 9.5–10.0 to 7.5–8.0 with 25% sulfuric acid. Filter at 65–70° C. The presscake weighed 650–690 g at 25–29% dry dye content.

334 g of the presscake (at 28% dry) is then added to a mixture of 20 g of water, 36 g of 50% caustic, and 62.4 g of 45% sodium sulfhydrate at 85° C., and the resulting mixture is stirred at 105° C. for 2 hours. The total weight of the liquid dye is 442 g. This liquid is then dyed as in Example 1 at 50 opg yielding 86.4% dye strength compared to a 91.5% strength for a C.I. Sulfur Black 10 type standard similarly prepared without the glyoxal and urea. The tendering is 57% compared to 67% for the standard Sulfur Black 10 dye used at 50 opg.

EXAMPLE 17

The procedure of Example 1 is repeated except that, instead of glyoxal alone, 32.2 g of 40% aqueous solution of glyoxal and 20 g of monoethanolamine are separately added followed by heating at 120–124° C. for 8 hours to complete the thionation reaction. The tendering of the fabric dyed with the resulting dye is 12.9% compared to 69.6% for the standard dye.

EXAMPLE 18

The procedure of Example 1 is repeated except that, instead of glyoxal alone, 32.2 g of 40% aqueous solution of glyoxal and 10 g of monoethanolamine are separately added followed by heating at 120–124° C. for 8 hours to complete the thionation reaction. The tendering of the fabric dyed with the resulting dye is 13.7% compared to 54.9% for the standard dye.

EXAMPLE 19

The procedure of Example 1 is repeated except that, instead of glyoxal alone, 32.2 g of 40% aqueous solution of glyoxal, 11.2 g of urea, and 20 g of monoethanolamine are separately added followed by heating at 120–124° C. for 8 hours to complete the thionation A reaction. Half of the resulting dye presscake is solubilized as usual, and the other half with additional 7 g of triethanolamine. The tenderings of the fabric dyed with the resulting dyes are 7.8% and 5.5%, respectively, compared to 53.5% for the standard dye.

EXAMPLE 20

The procedure of Example 1 is repeated except that, instead of glyoxal alone, 32.2 g of 40% aqueous solution of glyoxal, 11.2 g of urea and 10 g of monoethanolamine are separately added followed by heating at 120–124° C. for 8 hours to complete the thionation reaction. The tendering of the fabric dyed with the resulting dye is 4.6% compared to 54.9% for the standard dye.

EXAMPLE 21

The procedure of Example 1 is repeated except that, instead of glyoxal, 11.2 g of urea and 20 g of monoethanolamine are separately added followed by heating at 120–124° C. for 8 hours to complete the thionation reaction. The tendering of the fabric dyed with the resulting dye is 7.5% compared to 69.6% for the standard dye.

EXAMPLE 22

In an autoclave equipped with a reflux condenser and pressure control device 50 g of water are mixed with 317 g of 43% sodium sulfhydrate solution, 197 g of 50% sodium hydroxide and 280 g of sulfur. The resulting mixture is stirred for five minutes at 40–50° C. and another 100 g of 43% sodium sulfhydrate solution are added to form a polysulfide slurry. In a separate vessel 320 g of 50% sodium hydroxide solution are added over a period of one hour to a mixture of 700 g of water and 400 g of 2,4-dinitrochlorobenzene at 100° C. After heating for an additional thirty minutes, 15–20% of the resulting hot 2,4-dinitrophenolate solution is added to the polysulfide slurry. After the resulting exothermic reaction is over, the remainder of the 2,4-dinitrophenolate solution is added to the polysulfide and water is distilled off until the reflux temperature reaches 116° C. (about 1 to 1.5 hours). The resulting mixture is refluxed for an additional 30 minutes and then the autoclave is pressurized and heated until a gage pressure of 1.6 kg/cm$^2$ (22 psig) and a temperature of 140° C. are reached. The reaction mixture is maintained at this temperature for three hours and then cooled to 90° C., at which point the autoclave is opened and 150 g of water and 80 g of monoethanolamine are added. The autoclave is pressurized and heated until the gage pressure reaches 2.2 kg/cm$^2$ (30 psig) and the temperature of the reaction mixture is approximately 138° C. By use of the pressure control device the pressure is maintained at 1.6–1.7 kg.cm$^2$ for an additional three hours, after which time the reaction mass is cooled to 100° C. and 600 g of water at about 15–20° C. are added followed by 40 g of 98% sulfuric acid to precipitate the resulting modified sulfur dye. The precipitate is filtered and the wet presscake, weighing approximately 1055 g, is mixed with 150 g of 50% sodium hydroxide, 300 g of water and 80 g of 43% sodium sulfhydrate solution. The resulting mixture is heated for 30 minutes at reflux and another 40 g of 43% sodium sulfhydrate solution and 60 g of triethanolamine are added thereto. The resulting liquid dye weights 1550 grams. The tendering of fabric dyed with the resulting dye is 35–40% compared to about 80% tendering caused under otherwise identical conditions by the similar C.I. Sulfur Black 1 dye which has not been modified with monoethanolamine.

EXAMPLE 23

To an autoclave containing 700 g of the coupling mass for C.I. Sulfur Black 1 prepared as in Example 1 are added 25.8 g of monoethanolamine. The resulting mixture is heated to 90° C. and then the autoclave is closed and heated to 120–124° C. over 15 minutes. The autoclave is held at 120–124° C. for eight hours and then cooled to 90° C. and 0 psig. A pale yellow bleed-out in the spot test on plain filter paper shows completion of the thionation. The contents of the autoclave are transferred to a 3 liter beaker and the volume is adjusted to 1500 ml by addition of water. The contents of the beaker are aerated at 65–70° C. for 2.5 hours, after which time the spot test gives a blue bleed-out. The pH of the aerated mixture is lowered from 9.45 to 7.79 by addition of 44.3 g of 25% sulfuric acid and then it is filtered at 65–70° C. to give 209.29 g of dye presscake having a solids content of 53.8%.

A liquid dye is prepared by mixing 202 g of the aforementioned presscake with 74 g of 50% sodium hydroxide, 57 g of 45% sodium sulfhydrate and 70 g of water, heating at 103° C. with stirring for two hours and adjusting the final weight of 408 g by addition of water. The tendering of cotton twill fabric dyed using 20 opg of the above-described liquid dye is 19.5%.

EXAMPLE 24

2,4-Dinitrochlorobenzene (2485 lbs.) is hydrolyzed with a mixture of 2151 lbs. of 50% aqueous sodium hydroxide in 10,000 lbs. of water at 100° C. for 30 minutes in a phenolator to produce 2,4-dinitrophenolate. Separately, a thionator containing 5445 lbs. of polysulfide solution prepared in a manner analogous to that of Example 1 is heated to 118–122° C. With the phenolator at 100–104° C., the dinitrophenolate is slowly transferred therefrom to the thionator, where it is mixed with the polysulfide over a period of about one hour, during which a coupling reaction takes place while the temperature drops from about 120° to about 100–105° C. After the coupling reaction is complete, the contents are stirred for an additional thirty minutes and then the thionator is cooled to 90–95° C. The thionator is closed and 797 lbs. of 40% aqueous glyoxal are pumped into the coupling mass below its surface over a period of about 25–35 minutes followed by 554 lbs. of 50% aqueous urea over the same period of time. The resulting mixture is heated at 120–126° C. for 8 to 12 hours.

Two batches of thionation product produced as described above are cooled and combined in an aeration tank and aerated at 65–85° C. until the spot test gives a faint blue bleed out on filter paper. The aerated product is then adjusted to pH 6–7 with 25% sulfuric acid and filtered at 80–85° C.

The resulting presscake is mixed with 2500 lbs. of water, 3300 lbs. of 50% sodium hydroxide and 1900 lbs. of sodium sulfhydrate and heated to, 105–110° C. for two hours to produce 23,482 lbs. of black liquid sulfur dye.

What is claimed is:

1. A sulfur dye having reactively combined therein: 1) at least one sulfur dye intermediate of the formula I:

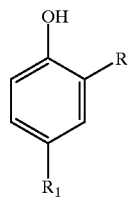

wherein R and $R_1$ are independently nitro, nitroso or amino; 2) sulfur or a sulfur compound; and 3) at least one modifying agent selected from the group consisting of: A) an aldehyde; C) a benzoquinone or a naphthoquinone; and reaction products of A, or C, the amount of said combined modifying agent representing at least 2% by weight based on the total weight of the sulfur dye.

2. The process of dyeing a substrate dyeable with a sulfur dye comprising treating said substrate with a sulfur dye of claim 1 under dyeing conditions.

3. A sulfur dye according to claim 1 wherein the modifying agent is selected from the group consisting of A) an aldehyde, and C) a benzoquinone or a naphthoquinone.

4. A substrate dyed in accord with the process of claim 2.

5. A sulfur dye of claim 3 in which the sulfur dye intermediate is 2,4-dinitrophenol.

6. A sulfur dye of claim 3 in which the aldehyde is a dialdehyde.

7. A sulfur dye of claim 6 in which the dialdehyde is glyoxal.

8. A sulfur dye of claim 3 in which the modifying agent is a combination of at least one aldehyde and urea.

9. A sulfur dye of claim 5 in which the modifying agent is glyoxal.

10. A sulfur dye of claim 5 in which the modifying agent is a combination of glyoxal and urea.

11. A sulfur dye according to claim 1 wherein A) is selected from the group consisting of acyclic aldehydes of the formulae $H(CH_2)_x$—CHO, OHC—$(CH_2)_x$—CHO, —OHC—$(CH_2)_x$—COOH and OHC—$(CH_2)_x$—$CH_2OH$, wherein x is 0 to 4, chloroacetaldehyde, cyclic aliphatic aldehydes and aromatic aldehydes.

12. A sulfur dye of claim 1 in which the modifying agent is p-benzene dialdehyde.

13. A sulfur dye of claim 1 in which the modifying agent is glutaric dialdehyde.

14. A sulfur dye of claim 1 in which the modifying compound is a benzoquinone or naphthoquinone.

15. A sulfur dye of claim 3 or 5 in which the modifying agent is glyoxylic acid.

16. A sulfur dye of claim 1 wherein the sulfur dye intermediate is 2,4-dinitrophenol.

17. A sulfur dye of claim 1 in which the modifying agent is a combination of: A) glyoxal, glyoxylic acid or a combination thereof; and B) urea.

18. The process of preparing a sulfur dye comprising forming a mixture comprising at least one modify, agent selected from the group consisting of A) an aldehyde and C) a benzoquinone or a naphthoquinone with 1) a) sulfur or a sulfur compound and b) a sulfur dye intermediate of the formula I:

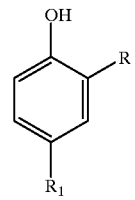

wherein R and $R_1$ are independently nitro, nitroso or amino, or 2) intermediary reaction products of sulfur or a sulfur compound and such sulfur dye intermediate, said intermediary reaction products formed in the presence or absence of such a molding agent, and subjecting the resulting mixture to elevated temperature for a time sufficient to form a sulfur dye, the amount of modifying agent employed in the process being at least 2% by weight based on the total weight of the sulfur dye.

19. A process according to claim 18 wherein the elevated temperature is in the range 90 to 300° C.

20. The process of preparing a sulfur dye comprising initiating reaction between a) sulfur or a sulfur compound and b) a sulfur dye intermediate of the formula I:

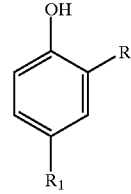

wherein R and $R_1$ are independently nitro, nitroso or amino, to form a first intermediary mixture comprising intermediary reaction products, forming a subsequent reaction mixture comprising such intermediary reaction products and at least one modifying agent selected from the group consisting of: A) an aldehyde; B) urea; and C) a benzoquinone or a naphthoquinone; and subjecting said subsequent reaction mixture to elevated temperature conditions for a time sufficient to form a sulfur dye, the total amount of modifying agent employed in such process representing at least 2% by weight of the total weight of the sulfur dye.

21. A process according to claim 20 wherein the modifying agent further comprises monoethanolamine.

22. A process according to claim 20 wherein the elevated temperature is in the range 90 to 300° C.

23. The process of claim 20 in which the initiated reaction between the sulfur or sulfur compound and sulfur dye intermediate is carried out in aqueous alkaline medium and in which said subsequent reaction mixture comprises an aqueous alkaline medium.

24. The process of claim 20 in which the modifying agent is an aldehyde.

25. The process of claim 20 in which the first intermediary reaction mixture comprises a coupling mass containing intermediary reaction products and in which said subsequent reaction mixture comprises upon formation said modifying agent and coupling mass.

26. The process of claim 18 in which the modifying agent comprises an aldehyde.

27. The process of claim 26 in which the aldehyde is glyoxal.

28. The process of claim 18 in which the modifying agent is a combination of at least one aldehyde and urea.

29. The process of claim 18, 23, 24, 25, 26, 27 or 28 in which the sulfur dye intermediate is 2,4-dinitrophenol.

30. The process of claim 25 in which the aldehyde is a dialdehyde.

31. The process of claim 30 in which the dialdehyde is glyoxal.

32. The process of claim 25 in which the modifying agent is a combination of: A) glyoxal, glyoxylic acid or combination thereof; and B) urea.

33. The process of claim 32 in which A is glyoxal.

34. A process according to claim 25 wherein the modifying agent is a combination of A) glyoxal, glyoxylic acid or a combination thereof, B) urea and D) monoethanolamine.

35. The process of claims 18, 20, 23 or 25 in which the modifying agent is glyoxylic acid.

36. The process of claim 30 in which the dialdehyde is p-benzene dialdehyde.

37. The process of claim 30 in which the dialdehyde is glutaric dialdehyde.

38. The process of claim 25 in which the modifying agent comprises a combination of: A) glyoxal, glyoxylic acid or combination thereof; and B) urea in a mol ratio of A) to B) in the range of 4:1 to 1:4.

39. The process of claim 35 in which the sulfur dye intermediate is 2,4-dinitrophenol.

40. The process of 18 in which modifying agent is a benzoquinone or naphthoquinone.

41. The process of claim 20 in which the modifying agent is a benzoquinone or naphthoquinone.

42. The process of claim 41 in which the modifying agent is a 1,2- or 1,4-benzoquinone or 1,2- or 1,4-naphthoquinone.

43. The process of claim 42 in which the benzoquinone or naphthoquinone modifying agent is unsubstituted or substituted by one or more $C_{1-4}$alkyl, $C_{1-4}$alkoxy, fluoro, chloro or bromo groups.

44. The process of claim 20 in which the sulfur dye intermediate of the formula I is 2,4-dinitrophenol and the process includes p-aminophenol as an additional sulfur dye intermediate.

45. The process of modifying a sulfur dye comprising reacting a) sulfur or a sulfur compound and b) a sulfur dye intermediate of formula I

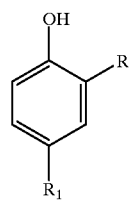

wherein R and $R_1$ are independently nitro, nitroso or amino, for a time sufficient to form a first sulfur dye, desulfurizing said first sulfur dye, forming a reaction mixture comprising the desulfurized dye and at least one aldehyde, benzoquinone, naphthoquinone or monoethanolamine modifying agent and heating said reaction mixture for a time sufficient to form a modified sulfur dye, the amount of modifying agent in the reaction mixture representing at least 2% by weight based on the total weight of the modified sulfur dye.

46. A process according to claim 45 wherein the modifying agent comprises at least one aldehyde, benzoquinone or naphthoquinone.

47. A process according to claim 46 wherein the desulfurized sulfur dye-containing reaction mixture is heated to 50 to 150° C.

48. A process according to claim 45 wherein the modifying agent is monoethanolamine.

49. A process according to claim 48 wherein the said reaction mixture is heated to at least 105° C.

50. The process of claim 46 in which the sulfur dye intermediate is 2,4-dinitrophenol.

51. The process of claim 46 in which the modifying agent comprises an aldehyde.

52. The process of claim 51 in which the aldehyde is glyoxal.

53. The process of claim 50 in which the aldehyde is a dialdehyde.

54. The process of claim 53 in which the dialdehyde is glyoxal.

55. The process of claim 53 in which the dialdehyde is p-benzene dialdehyde.

56. The process of claim 53 in which the dialdehyde is glutaric dialdehyde.

57. The process of claim 53 in which the mixture comprising the sulfur dye and dialdehyde additionally comprises water.

58. The process of claim 46 in which the aldehyde is glyoxylic acid.

59. The process of claim 50 in which the aldehyde is glyoxylic acid.

60. The process of claim 50 in which the modifying agent is hydroxyacetaldehyde or dimer thereof.

61. The process of claim 46 in which the modifying agent is a benzoquinone or naphthoquinone.

62. The process of claim 61 in which the modifying agent is a 1,2- or 1,4-benzoquinone or 1,2- or 1,4-naphthoquinone.

63. The process of claim 62 in which the benzoquinone or naphthoquinone modifying agent is unsubstituted or substituted by one or more $C_{1-4}$alkyl, $C_{1-4}$alkoxy, hydroxy, fluoro, chloro or bromo groups.

64. The process of claim 46 in which the sulfur dye intermediate of the formula I is 2,4-dinitrophenol and the process includes p-aminophenol as an additional sulfur dye intermediate.

65. The process of claim 64 in which the sulfur dye intermediate of the formula I is 2,4-dinitrophenol and the process includes picric acid or picramic acid or both as additional sulfur dye intermediate(s).

66. The process of claim 20 in which the sulfur dye intermediate of the formula I is 2,4-dinitrophenol and the process includes picric acid or picramic acid or both as additional sulfur dye intermediates.

67. A sulfur dye produced in accord with the process of claim 18, 20, 21, 23, 24, 25, 32, 33, 45, 46, 48 or 50.

68. A process according to claim 45 wherein the aldehyde contains no more than two hydroxy groups, when it is aliphatic.

69. A process according to claim 68 wherein the aldehyde contains no more than one hydroxy group, when it is aliphatic.

70. A process according to claim 45 which further comprises oxidizing the desulfurized dye and wherein the said reaction mixture comprises the desulfurized and oxidized dye and the modifying agent.

71. A sulfur dye according to claim 1, 3, 5 or 10 wherein the sulfur compound is sodium polysulfide or sodium sulfide.

72. A process according to claim 28 wherein the aldehyde is glyoxal or glyoxylic acid or a combination thereof.

73. A process according to claim 18, 28, or 72 wherein the sulfur compound is sodium polysulfide or sodium sulfide.

74. A process according to claim 73 wherein the mixture comprising the modifying agent is formed at or before the point in time which is 80% through the reaction time period between the first application of heat to drive the reaction after formation of a coupling mass and the cessation of the application of heating at the completion of thionation.

75. A sulfur dye obtainable by the process of claim 74.

76. A process according to claim 20, 25, 32 or 38 wherein the sulfur compound is sodium polysulfide or sodium sulfide.

77. A process according to claim 76 wherein the mixture comprising the modifying agent is formed at or before the point in time which is 50% through the reaction time period between the first application of heat to drive the reaction after formation of a coupling mass and the cessation of the application of heating at the completion of thionation.

78. A process according to claim 45 wherein the reaction mixture comprising the desulfurized dye and the modifying agent is heated at a pH in the range 5 to 9.

79. A process according to claim 45 wherein the aldehyde is selected from the group consisting of acyclic aldehydes of the formulae $H(CH_2)_x$—CHO, OHC—$(CH_2)_x$—CHO, OHC—$(CH_2)_x$—COOH and OHC—$(CH_2)_x$—$CH_2OH$ wherein, x is 0 to 4, chloroacetaldehyde, cyclic aliphatic aldehydes and aromatic aldehydes.

80. The process of preparing a sulfur dye comprising initiating reaction between a) sulfur or a sulfur compound and b) a sulfur dye intermediate of formula I:

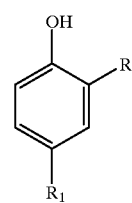

wherein R and $R_1$ are independently nitro, nitroso or amino to form a first intermediary mixture comprising a coupling mass containing intermediary reaction products, forming a subsequent reaction mixture comprising said coupling mass containing intermediary reaction products and at least one modifying agent selected from the group consisting of A) an aldehyde; B) urea; and C) a benzoquinone or a naphthoquinone; and D) monoethanolamine; and heating said subsequent reaction mixture at elevated temperature under pressure in a substantially enclosed reaction vessel for a time sufficient to form a sulfur dye, the total amount of modifying agent employed in such process representing at least 2% by weight of the total weight of the sulfur dye.

* * * * *